(12) United States Patent
Yamashita et al.

(10) Patent No.: US 6,640,499 B2
(45) Date of Patent: Nov. 4, 2003

(54) DOOR WEATHER STRIP STRUCTURE

(75) Inventors: Takashi Yamashita, Hiroshima (JP); Masaki Soda, Wako (JP)

(73) Assignees: Nishikawa Rubber Co., Ltd., Hiroshima-ken (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/963,306

(22) Filed: Sep. 26, 2001

(65) Prior Publication Data
US 2002/0035806 A1 Mar. 28, 2002

(30) Foreign Application Priority Data
Sep. 28, 2000 (JP) ......................................... 2000-296114

(51) Int. Cl.[7] ................................................ E06B 7/16
(52) U.S. Cl. ..................................... 49/484.1; 49/498.1
(58) Field of Search ............................. 49/479.1, 484.1, 49/475.1, 489.1, 498.1; 296/213

(56) References Cited
U.S. PATENT DOCUMENTS 4,901,476 A * 2/1990 Nagashima et al. ........ 49/484.1
5,347,758 A * 9/1994 Yamane ..................... 49/484.1
5,462,292 A * 10/1995 Yamane ..................... 49/484.1
6,131,342 A * 10/2000 Miyamoto et al. ......... 49/489.1

FOREIGN PATENT DOCUMENTS

DE         19835400 A1 *  2/1999  ............... 49/484.1

* cited by examiner

Primary Examiner—Jerry Redman
(74) Attorney, Agent, or Firm—Flynn, Thiel, Boutell & Tanis, P.C.

(57) ABSTRACT

A door weather strip structure includes a first weather strip and a second weather strip, fitted into a door sash. A seal block kept in elastic contact with a retainer of the door sash is provided in the vicinity of a connection between a molded part which is a portion of the second weather strip, corresponding to the roof of an automobile, and an extruded part on the side of a pillar, positioned on a side opposite from an extruded part on the side of a center pillar. The seal block prevents water intruding on the molded part from flowing down through the gap passage formed among the first weather strip, the second weather strip, and the door sash making ingress into the interior of the automobile through the lower part of the front pillar.

4 Claims, 3 Drawing Sheets

DOOR WEATHER STRIP STRUCTURE

BACKGROUND OF THE INVENTION

1. Field of the Invention

The present invention relates to a door weather strip structure for preventing water intruding from the roof of an automobile, and flowing down after passing through a gap between respective door weather strips and a door sash from making ingress into the interior of the automobile from a lower part of a front pillar.

2. Description of the Related Art

Referring to FIGS. 1 to 4, and FIG. 6, description is given hereinafter. In FIG. 6, there are employed symbols of an isosceles triangle wherein an altitude is drawn from a vertex thereof and half of the isosceles triangle, on one side of the altitude, is filled-in with black, and a region defined by a filled-in side part of the respective symbols represents a molded part, and respective regions on the unfilled-in side of the respective symbols represent extruded parts. A conventional door weather strip structure comprised of a first weather strip 10 having a hollow seal part 11, and a second weather strip 12 having a seal lip 13 is fitted to a door sash 20 of an automobile.

With such a conventional door weather strip structure, a high foam sponge 26 of an open-cell structure, having apparent specific gravity at around 0.1, is pasted to a portion of the first weather strip 10, corresponding to a lower part of a front pillar 24, to the extent on the order of 60 mm in length, with the use of a double-sided adhesive tape 27.

Because the molded part 14 having rigidity higher than that for the extruded parts, and lacking in adhesiveness is positioned in a corner of the door sash 20, corresponding to the roof 23 of the automobile, water 30 such as rain water is prone to intrude from the molded part 14. Further, the water 30 as intruded flows down towards a front pillar 24 after passing through a gap passage 15 formed among the first weather strip 10, the second weather strip 12, and the door sash 20, whereupon the water 30 makes ingress into the interior 28 of the automobile through a lower part of the front pillar 24, corresponding to spots where the door sash 20 is fixedly attached to a door panel 29 by welding. The high foam sponge 26 is installed in order to block intrusion of the water 30 due to such reasons as described above.

However, since the high foam sponge 26 is attached to the termination of the gap passage 15, at a portion of the first weather strip 10, corresponding to the lower part of the front pillar 24, an abundance of the water 30 is allowed to intrude over the whole length of the gap passage 15, so that the gap passage 15 will be in a state of storing the water 30 therein. Accordingly, it is difficult to prevent intrusion of the water 30 by use of the high foam sponge 26 alone. Particularly, in case of the high foam sponge 26 having undergone degradation due to change with aging, and so forth, intrusion of the water 30 becomes pronounced.

Furthermore, according to the conventional techniques, pasting of the high foam sponge 26 is carried out by use of the double-sided adhesive tape 27, and this has raised a problem that every time such pasting is carried out, manual work is involved at the expense of much time and effort, consequently leading to deterioration in productivity.

Therefore, a problem to be resolved by the invention is that since the conventional door weather strip structure comprised of the first weather strip 10 and the second weather strip 12 is intended to block intrusion of the water 30 into the interior of the automobile by pasting the high foam sponge 26 to the termination of the gap passage 15 by use of the double-sided adhesive tape 27, it has been difficult to ensure blocking of the intrusion of the water 30, and pasting work would require much time and effort, resulting in poor productivity

SUMMARY OF THE INVENTION

With reference to FIGS. 1, 5, and 6, description is given hereinafter. The present invention provides a door weather strip structure comprised of a first weather strip 10 having a hollow seal part 11 and a second weather strip 12 having a seal lip 13 and fitted into a door sash 20, wherein a seal block 25 kept in elastic contact with a retainer 21 of the door sash 20 is provided in the vicinity of a connection between a molded part 14 which is a portion of the second weather strip 12, corresponding to the roof 23 of an automobile, and an extruded part 17 on the side of a pillar, positioned on a side opposite from an extruded part 16 on the side of a center pillar, so that water 30 as intruded from the molded part 14 is prevented from flowing down through a gap passage 15 formed among the first weather strip 10, the second weather strip 12, and the door sash 20, and making ingress into the interior of the automobile through a lower part of a front pillar 24.

DESCRIPTION OF THE PREFERRED EMBODIMENTS

Figure 1:
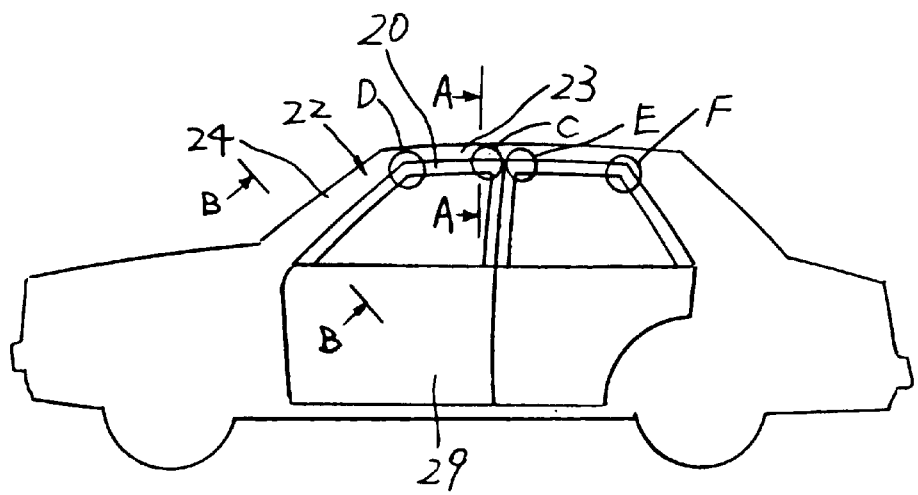
FIG. 1 is a side view showing an automobile provided with a door weather strip structure.
Figure 2:
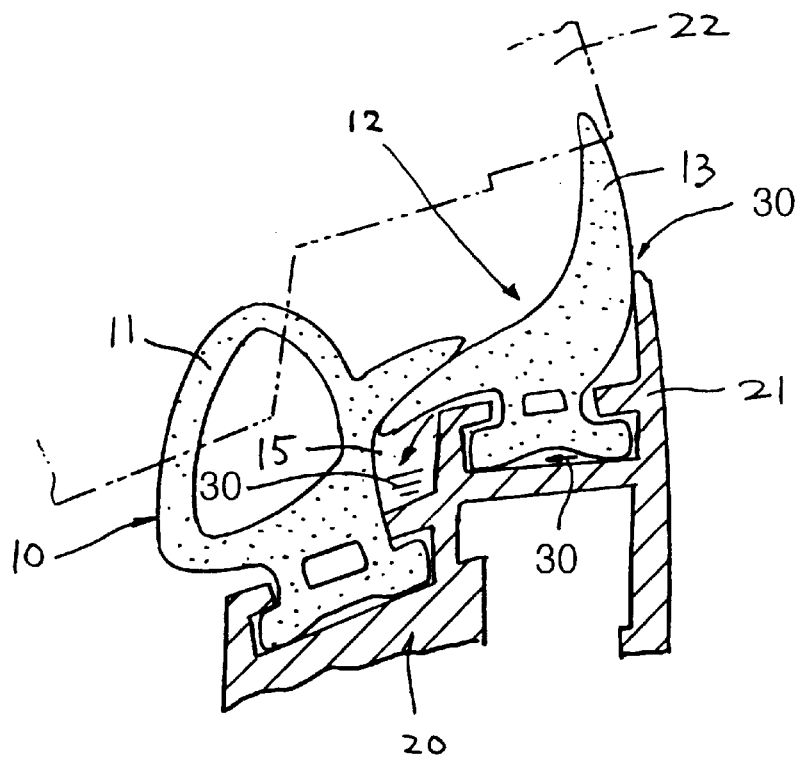
FIG. 2 is a cross-sectional view taken on line A—A of FIG. 1, showing a roof structure of the automobile according to a conventional door weather strip structure.
Figure 3:
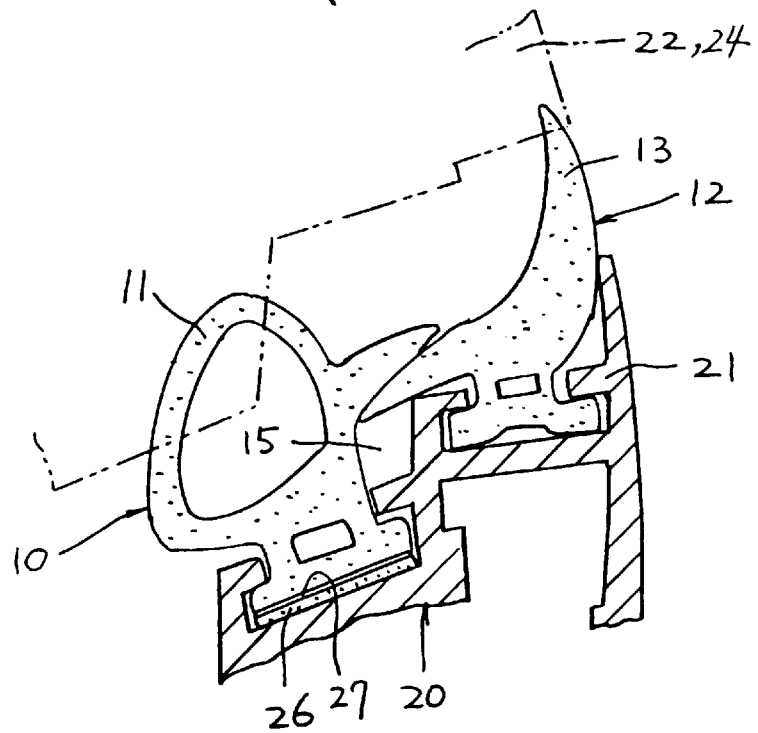
FIG. 3 is a cross-sectional view taken on line B—B of FIG. 1, showing a lower part structure of a front pillar according to the conventional door weather strip structure.
Figure 4:
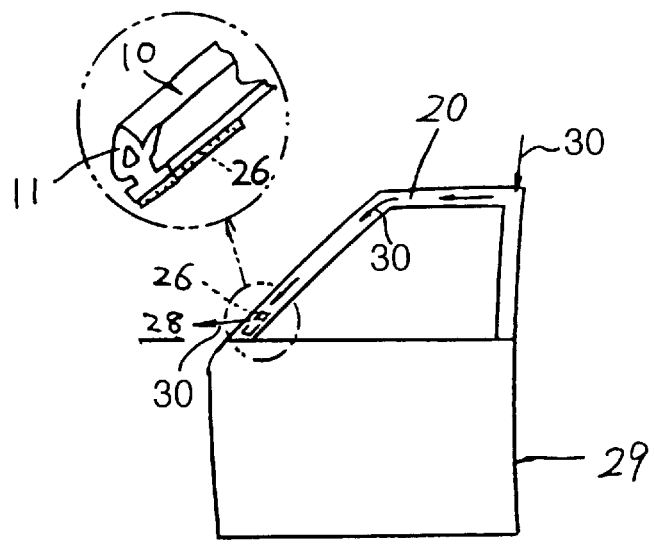
FIG. 4 is a schematic illustration showing a state of water making ingress into the interior of the automobile through a gap passage and a state of a high foam sponge pasted to a portion of a first weather strip, corresponding to a lower part of a front pillar according to the conventional door weather strip structure.
Figure 5:
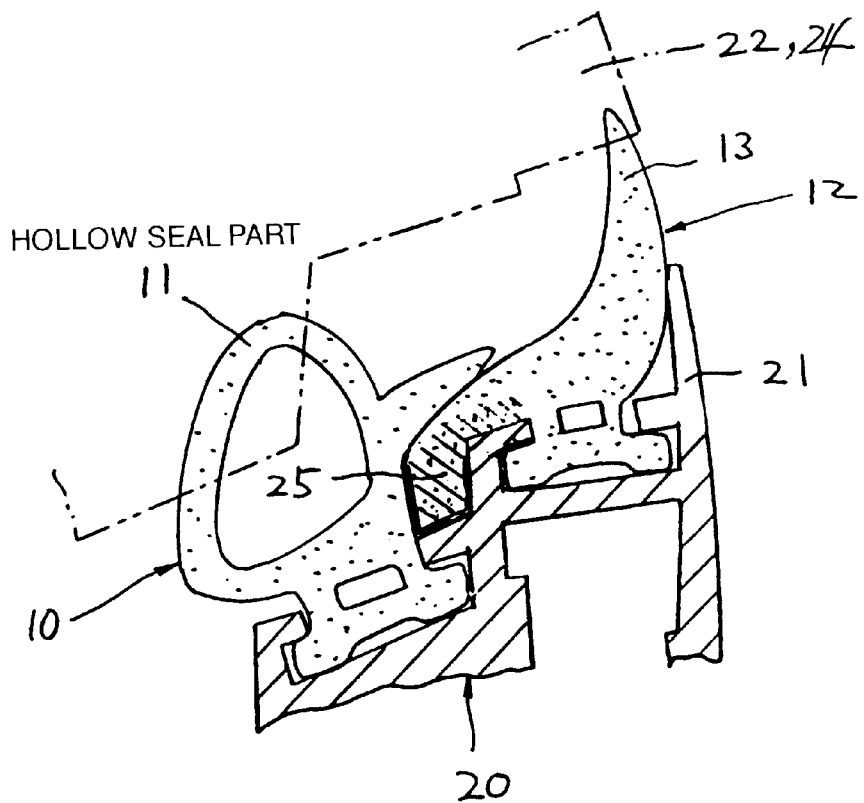
FIG. 5 is a cross-sectional view taken on line A—A of FIG. 1, showing an embodiment of a door weather strip structure according to the invention.
Figure 6:
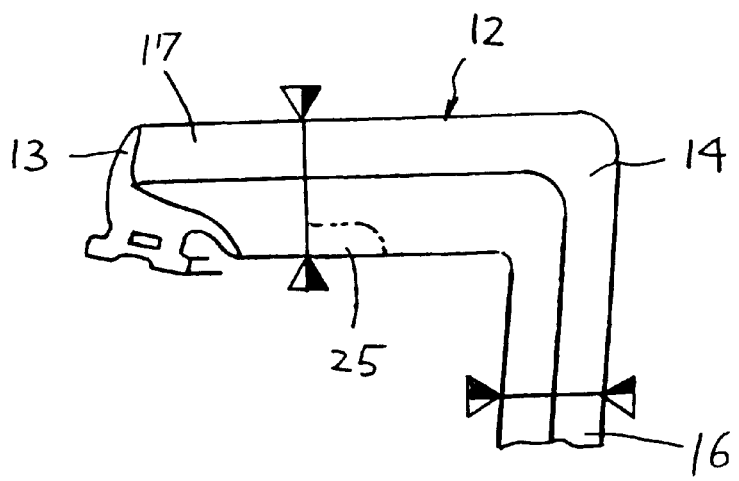
FIG. 6 is a schematic perspective view showing a second weather strip of the embodiment of the door weather strip structure in FIG. 5.

FIGS. 1, 5, and 6 show an embodiment of a door weather strip structure according to the invention. In FIG. 6, a region defined by a filled-in side part of respective symbols of an isosceles triangle represents a molded part 14. The door weather strip structure comprises a first weather strip 10 having a hollow seal part 11, and a second weather strip 12 having a seal lip 13, and is fitted into a door sash 20. The hollow seal part 11 of the first weather strip 10 is kept in elastic contact with an inner side part of a body panel 22 while the seal lip 13 of the second weather strip 12 is kept in elastic contact with an outer side part of the body panel 22.

In the door weather strip structure described above, a seal block 25 kept in elastic contact with a retainer 21 of the door sash 20 is provided in the vicinity of a connection between the molded part 14 which is a portion of the second weather strip 12, corresponding to the roof 23 of an automobile, and an extruded part 17 on the side of a pillar, positioned on a side opposite from an extruded part 16 on the side of a center pillar. The seal block 25 is extended to a length on the order of 3 to 5 mm. Further, the seal block 25 is preferably formed of the same material as that for the molded part 14 of the second weather strip 12, and preferably formed integrally with the molded part 14, however, the seal block 25 may be formed of either the same material or a different material, and may be formed separately from the molded part 14 to be pasted with each other.

With such a construction as described above, water 30 as intruded from the molded part 14 is prevented from flowing down through a gap passage 15 formed among the first weather strip 10, the second weather strip 12, and the door sash 20, and making ingress into the interior of the automobile through a lower part of a front pillar 24.

That is, the seal block 25 is positioned at a part of the second weather strip 12, corresponding to the roof 23, and at the starting terminal of the gap passage 15. Accordingly, the seal block 25 can completely prevent the water 30 from intruding into the gap passage 15. Thus, it is possible to avoid with certainty a risk of the water 30 building up in the gap passage 15, thereby making ingress into the interior of the automobile.

Further, in the case where the seal block 25 is formed integrally with the molded part 14, pasting work requiring much time and effort can be rendered unnecessary, so that it is possible to aim at significant improvement in productivity. It is further to be pointed out that the present embodiment is described by way of example with reference to only a front door C shown in FIG. 1, but the same is applicable to a front door D, and rear doors E, F as well.

With the structure according to the invention, since the seal block 25 kept in elastic contact with the retainer 21 of the door sash 20 is provided in the vicinity of the connection between the molded part 14 which is the portion of the second weather strip 12, corresponding to the roof 23 of the automobile, and the extruded part 17 on the side of the pillar, positioned on the side opposite from the extruded part 16 on the side of the center pillar, the water 30 as intruded from the molded part 14 can be prevented from flowing down through the gap passage 15 formed among the first weather strip 10, the second weather strip 12, and the door sash 20, and making ingress into the interior of the automobile through the lower part of the front pillar 24.

Furthermore, by forming the seal block 25 integrally with the molded part 14, the pasting work requiring much time and effort can be rendered unnecessary, and consequently, it is possible to aim at significant improvement in productivity.

What is claimed is:

1. A combination of:
   a first weather strip having a hollow seal part;
   a second weather strip having a seal lip and including a molded part;
   a door sash including a first opening for receiving said first weather strip therein, a first wall forming part of the first opening, said first weather strip extending along a length of said door sash, said door sash including a second opening for receiving said second weather strip, a second wall forming part of the second opening, said second weather strip extending along a length of said door sash, the first wall of the door sash being substantially orthogonal to the second wall; and
   a seal block having a substantially block-shape and secured to a side of said second weather strip opposite from said seal lip and positioned between said first weather strip and said second weather strip adjacent said door sash and contacting the first wall and the second wall substantially orthogonal to the first wall of said door sash for preventing leakage of water.

2. The combination of claim 1, said first weather strip including a projecting sealing lip wherein said seal block contacts a portion of said first weather strip spaced from said projecting sealing lip.

3. A door weather strip structure comprising:
   a first weather strip having a hollow seal part including a first outwardly projecting seal lip;
   a second weather strip including a second seal lip projecting outwardly in a first direction from a first side thereof and said second weather strip having a second opposing side; and
   a seal block having a block-shape and secured to said second weather strip at the second opposing side thereof and projecting outwardly from said second weather strip in a second opposing direction, said seal block having a cross sectional thickness greater than the cross sectional thickness where said seal block is secured to said second weather strip,
   wherein said seal block is located between said first weather strip and said second weather strip, said seal block having a first side for contacting a first surface of a door sash and a second side substantially orthogonal to the first side for contacting a second surface of said door sash, a portion of said seal block contacting a surface of said first weather strip at a position spaced from said first outwardly projecting seal lip.

4. The door weather strip structure of claim 3, wherein said seal block is monolithic with said second weather strip.

* * * * *